March 1, 1955     M. BIRNBAUM     2,703,364
FILTER SYSTEM
Filed Oct. 18, 1948     3 Sheets-Sheet 2
FIG. 2     FIG. 4
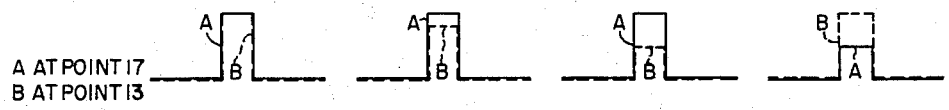
A AT POINT 17
B AT POINT 13
TUBE 50,
PLATE 56
TUBE 60,
PLATE 66
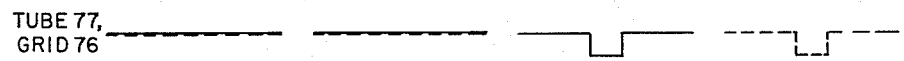
TUBE 77,
GRID 76
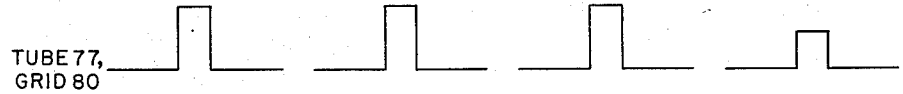
TUBE 77,
GRID 80
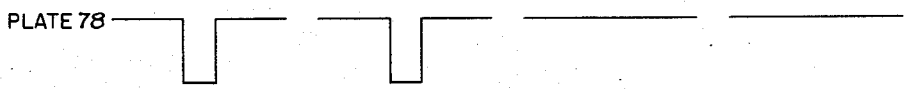
PLATE 78
FIG. 3     FIG. 5
*INVENTOR.*
MILTON BIRNBAUM
BY
*ATTORNEY*

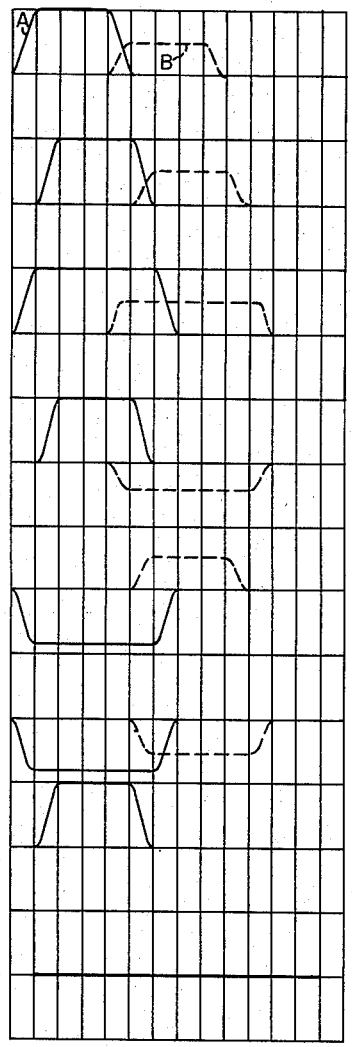

United States Patent Office 2,703,364
Patented Mar. 1, 1955

2,703,364

FILTER SYSTEM

Milton Birnbaum, Washington, D. C.

Application October 18, 1948, Serial No. 55,121

5 Claims. (Cl. 250—27)

(Granted under Title 35, U. S. Code (1952), sec. 266)

This invention relates to radio pulse systems and more particularly to systems for receiving and filtering or discriminating between pulses in accordance with their relative amplitudes and time relationships.

Radio pulse signalling is extensively employed in beacon systems for supplying direction finding information to air traffic and in transponder systems for identifying ships and aircraft. The term "transponder systems" is intended to describe a wave-signal system which includes a receiving system and a transmitting system so arranged that a predetermined answer or reply signal is transmitted in response to a received interrogating signal. Beacon and transponder systems are commonly coded to insure secrecy and to permit discrimination between systems operating in the same general area. The codes employed may be based on the time relationship relative to each other of a plurality of periodically repeated radio pulses.

While the systems of the prior art have proved to be generally satisfactory, it has been found that their proper functioning is sometimes prevented by interfering echo waves reflected from the ground or sea and other objects, and also by interfering signals generated intentionally by hostile forces. It is therefore the general object of this invention to provide a filter or discriminating circuit for use in a receiving system, the filter or discriminating circuit being operative to reject all received signals except those having pulse amplitudes falling within a predetermined range of relative values as well as having pulses with a predetermined time relationship relative to each other.

It is another object of this invention to provide a filter or discriminating system which is free from spurious outputs caused by the inevitable sloping leading and trailing edges of radio pulses.

It is a further object to provide a filter or discriminator system which will reject extremely narrow pulses and hence provide what is commonly called spike suppression.

It is a further object to provide a highly developed filter or discriminator system employing a minimum of circuit elements which may be assembled in a relatively small space, the system being also easy and economical to manufacture.

It is a further object to provide a system for comparing the amplitudes of simultaneous pulses to determine which is the greater and the magnitude of the difference.

In pursuance of these and other objects which will be apparent to those skilled in the art, a receiving system has been provided which is exclusively responsive to a transmitted radio signal consisting of periodically repeated pairs of pulses of equal amplitude, the pulses in each pair having a predetermined time spacing. The receiving system is not responsive to a periodically repeated single pulse and an echo pulse accidentally having the predetermined time spacing relative to the single pulse because the echo pulse will be of lower amplitude than the single pulse and the system is exclusively responsive to a pair of pulses of equal amplitude. The receiving system is also not responsive to a transmitted radio signal consisting of a pair of pulses of equal amplitude having a time spacing different from the predetermined value.

Briefly, the presently preferred embodiment of the invention comprises delay line means operative to render simultaneous those received pulses having predetermined relative time relationship, delay-line-and-rectifier means operating to supply both delayed and widened versions of the received pulses, comparator tubes receptive to the delayed and widened pulses and operative to compare their plateau amplitudes, and a mixer tube receptive to the outputs of the comparator tubes and a delayed pulse from the delay-line-and-rectifier means and operative to supply an output when pulses are received by the delay line means having the predetermined relative amplitudes and time relationships.

For a better understanding of the present invention, reference is had to the following description taken in conjunction with the accompanying drawings wherein:

Figure 1 is a schematic circuit diagram of the one embodiment of the invention;

Figures 2 through 5 inclusive are graphical representations of the steps performed by the system shown in Figure 1 when the delay line and rectifier means are shorted out by the jumpers shown as dotted lines, the figures showing conditions when the received pulses are of equal and also of different amplitudes;

Figure 6 is a graphical representation of the steps performed by the system shown in Figure 1 when the received pulses are of the same amplitude and spaced by the predetermined amount;

Figure 7 is a graphical representation of the steps performed when the received pulses are of different amplitudes and spaced by the predetermined amount, the representation illustrating how the edge effects of the pulses are eliminated from the output, and Figure 8 is a graphical representation of the steps performed when the received pulses are of different amplitudes and not spaced by the predetermined amount, the representation illustrating how the edge effects of the pulses are eliminated from the output.

Referring now in greater detail to the drawings, a radio receiver 10 tuned to a predetermined frequency receives signals through antenna 11, the output of the receiver being connected by wire 12 with the input 13 of a delay line 14 and the input 15 of a pulse widening means generally designated 16. The output of the delay line 14 is connected at point 17 with a resistor 18 having the characteristic impedance of the line 14 and to the input 19 of another pulse widening means generally designated 20. The pulse widening means 16 and 20 are the same, each having, respectively, a delay line 22, 32 centertapped at 23, 33, a characteristic terminal impedance 24, 34, an input rectifier 25, 35, an output rectifier 26, 36, the other sides of the rectifiers being connected at 27, 37, to the top end of a grounded potentiometer 28, 38, having an adjustable contact 29, 39.

The delay lines 14, 22 and 32 are video lines preferably of the single sided type comprising a solenoid or a universal progressive winding on a cylindrical plastic form which is silver plated and slotted, the silver plate providing distributed capacitance and being connected to ground. Rectifiers 25, 26, 35 and 36 are preferably germanium crystal diodes. Jumpers 42, 43, 44 and 45, represented by dotted lines, short out the pulses widening means 16 and 20. They are shown for reasons which will be apparent as the description proceeds.

Pulse amplitude comparator tubes 50 and 60 are duo triodes each having, respectively, a first cathode 51, 61, a first grid 52, 62, a first plate 53, 63, a second cathode 54, 64, a second grid 55, 65, and a second plate 56, 66. The cathodes of tube 50 have a common cathode resistor 57 connected to ground. The cathodes of tube 60 have a common cathode resistor 67 connected to ground. The second plates 56 and 66 of tubes 50 and 60, respectively, are connected through plate resistors 58 and 68 to the positive plate voltage bus. The first plates 53 and 63 are connected directly to the positive bus.

The centertap 33 of delay line 32 is connected by wire 70 to grid 52; the centertap 23 of delay line 22 is connected by wire 71 to grid 62; the contact 39 is connected by wire 72 to grid 65; and the contact 29 is connected by wire 73 to the grid 55.

The plates 56 and 66 are connected through rectifiers 74 and 75 respectively to the control grid 76 of a signal mixing tube 77. The plate 78 is connected through plate resistor 79 to the positive plate voltage bus. The centertap 33 of delay line 32 is connected to suppressor grid 80 through wire 81 and rectifier 82. The plate 78 is connected by wire 83 to an amplifier 84, the output of which is applied to a relaxation oscillator 85 such as a multivibrator, blocking oscillator or thyratron. The output 86 of the relaxation oscillator may be employed to energize an indicator or to control the operation of other equipment.

The desired signal to be picked up by antenna 11 consists of periodically recurring pairs of pulses, there being a fixed predetermined time relationship between the pulses A and B of each pair. The operation of the system when the desired signal is received, considering a single pair of pulses, is as follows: The pair of pulses A and B from receiver 10 is applied to the input 13 of delay line 14. The delay line 14 delays the pulses by the predetermined amount corresponding with the spacing of the pulses with the result that pulse A at point 17 occurs simultaneously with pulse B at point 13. As will subsequently appear, the system produces an output only when simultaneous pulses are present at points 13 and 17, and therefore the system rejects all signals having other than the predetermined spacing.

The operation of the system will first be described, with the aid of Figures 1 through 5, assuming that the pulse widening means 16 and 20 are shorted out by jumpers 42 through 45. Pulse A is applied through jumper 45 and wire 70 to the grid 52 of tube 50 simultaneously with the application of pulse B through jumper 42, potentiometer 28 and wire 73 to grid 55 of the same tube. The A pulse being positive causes a current through cathode resistor 57, cathode 51, and plate 53 raising the potential of cathode 54, decreasing the current through plate resistor 58 and thereby causing a positive pulse on the plate 56. The B pulse simultaneously applied to grid 55 causes an increase in current through plate resistor 58 thereby generating a negative pulse on the plate 56. The voltage on plate 56 is the difference between the positive pulse produced by pulse A and the negative pulse produced by pulse B.

Pulse B is applied through jumper 43 and wire 71 to the grid 62 of tube 60 simultaneously with the application of pulse A through jumper 44, potentiometer 38 and wire 72 to grid 65 of the same tube. The B pulse tends to produce a positive pulse on the plate 66 and the A pulse tends to produce a negative pulse at the same point, the actual voltage being the difference between the two. When pulse A is larger than pulse B, a net negative pulse appears on plate 66; and when pulse B is larger than pulse A, a net negative pulse appears on plate 56. Only the net negative pulses from plates 56 and 66 are allowed to pass through rectifiers 74 and 75 to the control grid 76 of mixer tube 77. In this way, a negative pulse is applied to grid 76 whenever pulses A and B differ in amplitude.

The portion of the system thus far described is possible of application in many useful ways, as will be apparent to those skilled in the art. The separate outputs of rectifiers 74 and 75 may be used to indicate which of two input pulses is larger and the amount of the difference in amplitude. When there is an output from rectifier 75, the pulse applied to grid 52 of tube 50 is larger, and when there is an output from rectifier 74, the pulse applied to grid 62 of tube 60 is larger. The potentiometers 28 and 38 may be adjusted so that the rectifier outputs indicate the excess over preset amounts of one pulse amplitude over another. Alternatively, the potentiometers may be calibrated to indicate the excess.

A positive A pulse is applied throught jumper 45, wire 81 and rectifier 82 to the suppressor grid 80 of mixer tube 77. A negative output pulse will appear on the plate 78 of mixer tube 77 in response to the positive A pulse on the suppressor grid 80 provided that no negative pulse appears simultaneously on the control grid 76 from plates 56 and 66. A negative pulse appears on plate 56 and grid 76 when the simultaneous pulse B is larger in amplitude than A by more than an adjustable preset amount determined by circuit constants and potentiometer 28. A negative pulse appears on plate 66 and grid 76 when pulse A is larger in amplitude than B by more than an adjustable preset amount determined by circuit constants and potentiometer 38. No negative pulse appears on grid 76 when simultaneous pulses A and B differ in amplitude by less than the adjustable preset amounts.

The system is not responsive to a single received pulse, because while the pulse would be applied through wire 81 to grid 80 of the mixer tube 77, the same single pulse would simultaneously go through jumper 44, potentiometer 38, wire 72 to grid 65 causing a negative pulse on plate 66 which would be applied to grid 76. This negative pulse on grid 76 would counteract the positive pulse on grid 80 so that no output pulse would appear on the plate 78. The system is responsive to positive pulses occurring simultaneously at points 15 and 19 because the pulses neutralize each other in comparator tubes 50 and 60 so that no negative pulse is applied to grid 76 of mixer tube 77. One of the pulses applied directly through wire 81 to grid 80 of tube 77 is then unhampered in producing a negative output pulse on the plate 78 of the mixer tube. It is apparent that the system is not responsive to the undelayed A signal passing through wire 12 to point 15 because there is no simultaneous B pulse at point 19. Likewise the system is not responsive to the delayed B pulse at point 19 because there is no simultaneous A pulse at point 15. The system is exclusively responsive to a received pair of pulses having the predetermined time relationship and the predetermined range of relative amplitudes.

Figure 2 illustrates the amplitudes and polarities of pulses at various points in the system when the A and B pulses are equal in amplitude. It will be noted that the equal A and B pulses neutralize each other so that there is no negative pulse on control grid 76 to block an output due to the positive A pulse on the suppressor grid 80.

Figure 3 illustrates the pulses in the system when pulse B is less than pulse A but is not enough less to result in a negative signal on grid 76 because of the setting of potentiometer 38.

Figure 1:
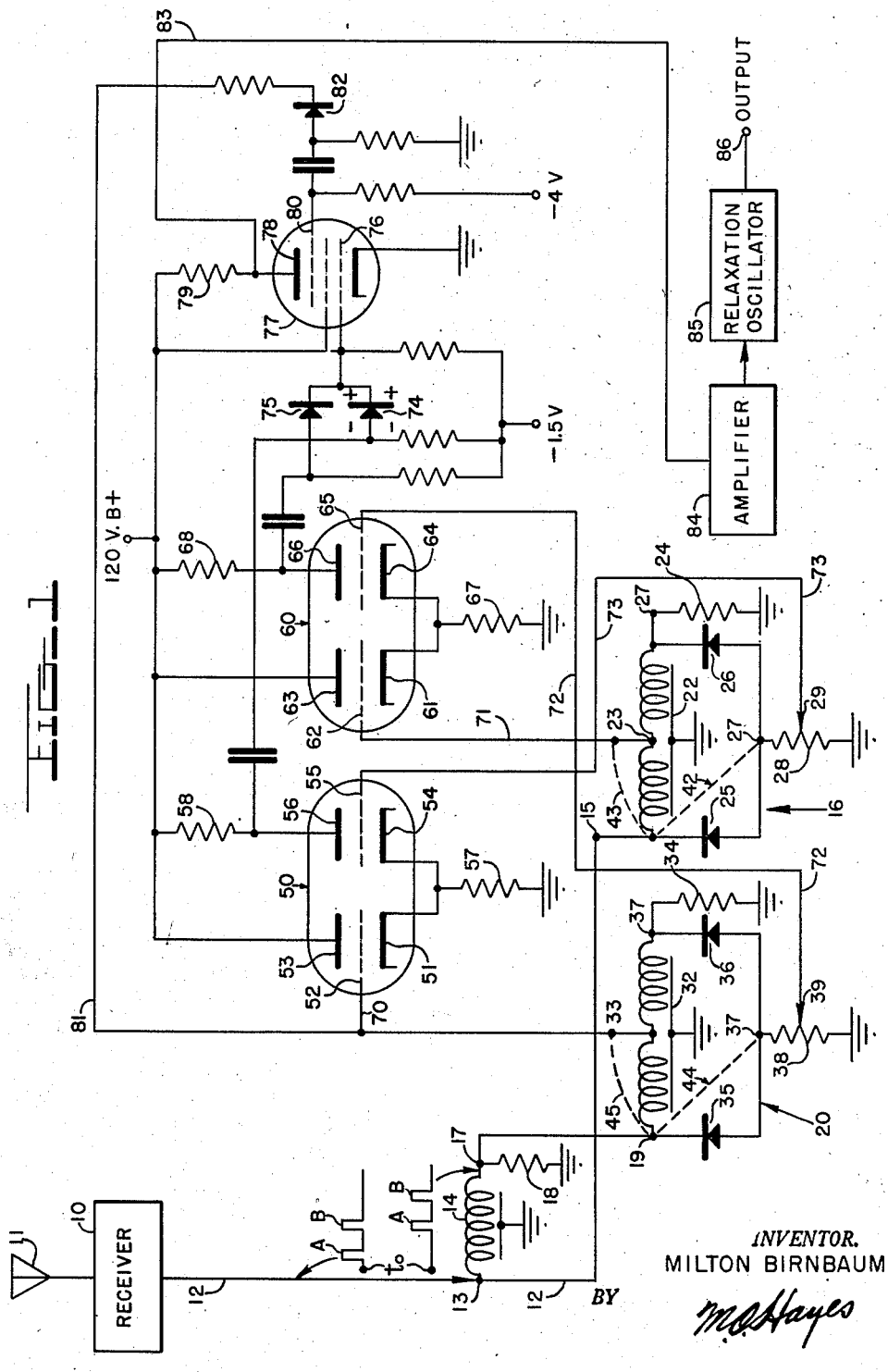

In Figure 4, pulse B is considerably less than pulse A so that pulse A causes a negative pulse on grid 76 which neutralizes the effect of pulse A on the suppressor grid 80. No output pulse appears on plate 78. Figure 5 shows the converse of Figure 4.

It is apparent that a filtering or discriminating system has been provided which excludes from its output all received signals except those having a predetermined relative time relationship and a predetermined range of relative amplitudes. Echo signals reflected from the earth or objects have a smaller amplitude than the main signals, and by the use of the system of this invention, a single pulse (like A in Figure 4) and its echo (like B in Figure 4) cannot get through the system to give a false indication. Only paired pulses having almost equal amplitudes get through.

The description thus far has assumed that the A and B pulses occur simultaneously and have vertical leading and trailing edges. Since pulses always have sloping leading and trailing edges and since the system as described gives an output indication whenever a portion of the compared pulses are equal regardless of their absolute amplitudes, pulse widening means 16 and 20 are inserted in the system to eliminate spurious outputs resulting from pulse edge effects. The system including pulse widening means 16 and 20 is responsive only to the plateau amplitudes of the pulses received.

Referring now to Figure 1 and assuming that the shorting jumpers 42 through 45 are removed, the pulse A in going from point 19 to the centertap 33 of the delay line 32 is delayed by an amount corresponding to at least the width of the sloping leading edge of the pulse. The A pulse continues down the line to point 37 and is delayed by an amount corresponding to at least the width of the sloping trailing edge of the pulse. When the A pulse first appears at point 19, a current begins to flow through rectifier 35 and potentiometer 38 to ground. When the A pulse first appears at point 37, a current begins to flow through rectifier 36 and potentiometer 38 to ground, as well as through rectifier 35, the total current through potentiometer 38 being the same as before. When the A pulse is no longer present at point 19, it continues to be present at point 37 and the current through potentiometer 38 remains the same until the pulse is no longer present at point 37. As a result a widened pulse of constant amplitude appears at the contact 39 of potentiometer 38. The pulse at the centertap 33 is unwidened and centered with respect to the widened pulse at contact 39, the widened pulse starting before the pulse at 33 and ending after the pulse at 33. The B pulse is acted upon in the same way by the pulse widening means 16. When pulses A and B are coincident, the various wave forms are as represented in Figure 6. It will be noted that the widened A and B pulses applied to the grids 55 and 65 overlap the unwidened pulses applied to the grids 52 and 62 and produce edge spikes on the grid 76. The edge spikes on grid 76 neutralize the sloping edges of the A pulse applied to grid 80 so that the output pulse on plate 78 corresponds in time with the plateau of pulse A.

When pulses A and B are coincident as shown in Figure 6, there is no advantage flowing from the use of pulse widening means 16 and 20. But if, as shown in Figure 7, the B pulse is an echo of pulse A having a reduced amplitude and it is simultaneous in time with the A pulse, the amplitudes of the pulses are equal during the times when their sloping and leading edges coincide. In the absence of pulse widening means 16 and 20, the output on plate 78 of tube 77 would include spurious and misleading narrow pulses. But, as shown in Figure 7, the overlapping edges of the widened pulses produce spikes on the grid 76 which preclude output indications during the slope times. An output corresponding to the pulse plateaus is also precluded by reason of the difference in the plateau amplitudes.

The edge effects of the pulses are always excluded and only the plateau amplitudes are compared.

In Figure 8 an echo plus B of a main pulse A is received with reduced plateau amplitude and in delayed time relationship with the pulse A. The amplitudes of the pulses are within the predetermined range of relative amplitudes for a short time where the envelopes intersect, but an output indication is prevented by pulse edge suppression resulting from applying a widened version of the A pulse to the grid 76.

It is apparent that a system has been provided which is exclusively responsive to a pair of pulses having a predetermined time relationship and a predetermined range of relative amplitudes. It is further apparent that the system is free from erroneous indications due to the sloping leading and trailing edges of the pulses.

While the principles of the method of the invention and one specific system for practicing the method have been described, it will be clearly understood that this has been done by way of example and not as a limitation on the scope of the invention as set forth in the objects thereof and the appended claims.

The invention described herein may be manufactured and used by or for the Government of the United States of America for governmental purposes without the payment of any royalties thereon or therefor.

What is claimed is:

1. In a decoder system subject to receive a pair of simultaneous input pulse signals of varying amplitude, means responsive to a pair of simultaneous pulses having the same amplitude comprising: a vacuum tube comparator means, means for supplying thereto said pair of input pulses and operative to generate a difference pulse in accordance with the amplitude difference of said pair of input pulses, and vacuum tube mixer means and means for supplying thereto one of said pair of input pulses and amplitude difference pulse and operative to generate a pulse when the difference pulse is of negligible amplitude.

2. A radio circuit selectively responsive to a pair of periodic signal pulses having a uniform amplitude and a predetermined time relationship comprising delay line means, means for connecting thereto said pair of periodic pulses to delay the same in accordance with said predetermined time relationship for rendering the two desired pulses simultaneous, amplitude comparator means connected to said delay line means operative to generate a pulse when the amplitude of the first pulse is greater than the second, a second comparator means connected to said delay line means operative to generate a pulse when the amplitude of the first pulse is smaller than the second, and mixer means connected to receive one of said pair of periodic signal pulses and the outputs of the comparator means and operative to produce an output when said pair of periodic signal pulses are of equal amplitude.

3. A system for discriminating against all received signals except those embodying a periodic pair of first and second pulses having a predetermined time relationship and a predetermined range of relative plateau amplitudes, comprising: delay line means and means connecting thereto said pair of pulses to delay said pulses in accordance with said predetermined time relationship for rendering the two desired pulses simultaneous, delay-line-and-rectifier means, means connecting thereto said simultaneous pulses for widening the simultaneous pulses, a comparator means connected to said delay-line-and-rectifier means operative responsive to the first pulse and the second widened pulse to produce a difference pulse when the second pulse is greater in amplitude by a preset amount, a second comparator means connected to said delay-line-and-rectifier means operative responsive to the second pulse and the first widened pulse and operative to produce a difference pulse where the first pulse is greater in amplitude by a preset amount, the difference pulses having a central portion when the pulses differ in plateau amplitude by a preset amount and having edge spikes where the widened pulse overlaps the unwidened pulse, and mixer means and means supplying thereto one of said simultaneous pulses and the difference pulses and operative to generate an output pulse when the central portion of the difference pulses are zero, the edge spikes of the difference pulses being operative to neutralize the sloping edges of said simultaneous pulse.

4. A system for comparing the relative plateau amplitudes of first and second simultaneous input pulses without error due to the sloping edges of the pulses, comprising delay-line means, means connecting thereto said simultaneous input pulses to provide first and second simultaneous widened pulses, amplitude comparator means connected to said delay-line means to receive said first input pulse and said second widened pulse, second amplitude comparator means connected to said delay-line means to receive said second input pulse and said first widened pulse, both of said comparator means operative to generate a resultant pulse when the amplitude difference between the input pulses exceeds a predetermined amount, said resultant pulses also including edge spikes due to the widened pulses overlapping the input pulses at the edges, and mixer means and means connecting thereto one of said input pulses and said resultant pulses and operative to generate an output when the resultant pulses are of negligible amplitude, the spikes on the edges of the resulant pulse being operative to neutralize the sloping edges of said one input pulse.

5. A circuit for rejecting all received signals except those having pulses of substantially uniform amplitude and a predetermined periodic time relationship, comprising delay line means, means for connecting thereto said periodic signal pulses, said delay line means operative to delay said periodic signal pulses in accordance with said predetermined time relationship to render a pair of said pulses simultaneous, amplitude comparator means connected to said delay line means to receive said simultaneous pulses and operative to generate a difference pulse when the amplitudes of said pair of periodic signal pulses differ by more than a predetermined amount, received pulses of periods other than the desired period result in said amplitude comparator means generating a difference pulse due to said pulses not being fed simultaneously to said comparator means, and mixer means connected to receive one of said pair of periodic signal pulses and the output of said comparator means and operative to produce an output when said difference pulse is of negligible amplitude.

References Cited in the file of this patent

UNITED STATES PATENTS

| | | |
|---|---|---|
| 2,236,134 | Gloess | Mar. 25, 1941 |
| 2,252,599 | Lewis | Aug. 12, 1941 |
| 2,408,079 | Labin | Sept. 24, 1946 |
| 2,416,424 | Wilson | Feb. 25, 1947 |

FOREIGN PATENTS

| | | |
|---|---|---|
| 528,192 | Great Britain | Oct. 24, 1940 |